Figure 1:
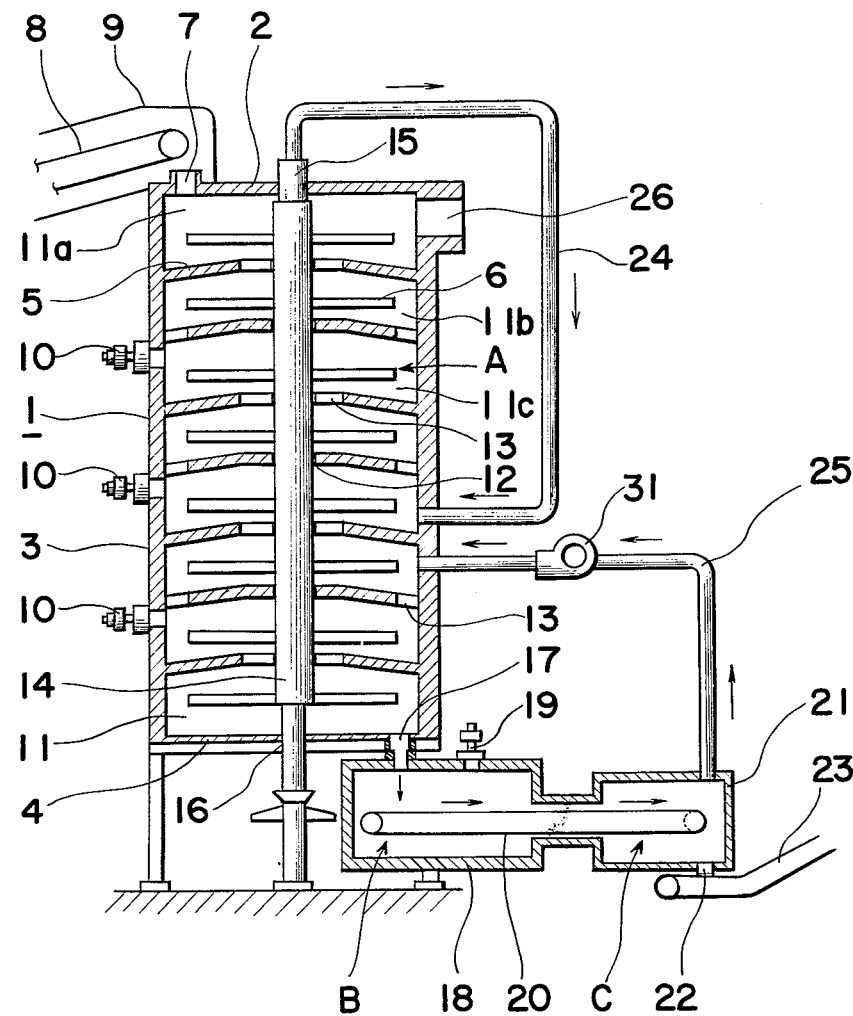

United States Patent [19]

Yamada

[11] 3,968,756
[45] July 13, 1976

[54] METHOD FOR INCINERATION OF A SLUDGE CONTAINING CHROMIUM SUBSTANCE AND APPARATUS THEREFOR

[75] Inventor: Shintaro Yamada, Toyanaka, Japan
[73] Assignee: Chugairo Kogyo Kaisha Ltd., Osaka, Japan
[22] Filed: Aug. 19, 1975
[21] Appl. No.: 605,927

[30] Foreign Application Priority Data
Aug. 20, 1974  Japan.............................. 49-95629

[52] U.S. Cl..................................... 110/12; 110/1 J
[51] Int. Cl.²............................................ F23G 7/00
[58] Field of Search............. 423/210, 595; 110/1–5, 110/1 H, 8 R, 7 R, 12

[56] References Cited
UNITED STATES PATENTS

| | | | |
|---|---|---|---|
| 2,119,601 | 6/1938 | Raisch | 110/12 |
| 2,744,477 | 5/1956 | Hartley et al. | 110/12 |
| 3,777,680 | 12/1973 | Eck | 110/12 |
| 3,921,543 | 11/1975 | Menigat et al. | 110/8 |

*Primary Examiner*—Kenneth W. Sprague
*Attorney, Agent, or Firm*—Wenderoth, Lind & Ponack

[57] ABSTRACT

There is disclosed a method for incineration of chromium-content-containing sludge and an apparatus therefor, in which the sludge is incinerated into ashes containing hexad chromium, which is, then, introduced into reducing gas to reduce the hexad chromium into triad chromium and, in turn, is cooled to stabilized the triad chromium, thereby to render to make the sludge harmless for discharging to the outside.

10 Claims, 4 Drawing Figures

METHOD FOR INCINERATION OF A SLUDGE CONTAINING CHROMIUM SUBSTANCE AND APPARATUS THEREFOR

The present invention relates to a method for incinerating and disposing of sludge and an apparatus therefor, and, more particularly, to a method for incinerating and disposing of sludge containing chromium substance which is produced from a drainage to be discharged in chemical and steel factories, and an apparatus therefor.

Generally, as the sludge of the factories is always discharged together with a lot of water, the sludge is firstly treated to reduce the water content through an optionally-selected dehydrating operation such as vacuum filtering, a pressure filtering, centrifugal dehydration and the like. The sludge which was dehydrated to some extent is dried and, then is incinerated by a burner into ashes in a furnace. To exhaust the ashes to the outside, it is desired in view of public health that no harmful materials such as hexad chromium be contained in the ashes. However, as a matter of fact, heavy metal irons, especially, hexad chromium irons often exist in a drainage discharged in metal plating factories and tanning factories. Since hexad chromium in ashes is a harmful material, it is usually prohibited by the public office in Japan to discharge from the factories a drainage containing hexad chromium in great quantities more than 0.5 ppm. in the drainage. Therefore, the factories is compelled to make the hexad chromium in the drainage decrease in such a manner that the hexad chromium is reduced into triad chromium with a reducing agent such as sodium sulfite, sodium bisulfite and the like, and, then, the triad chromium is removed from the drainage by operation of neutralizing cohesion precipitation. However, the sludge being produced from the drainage in the factories still contains a lot of chromium by any means. For instance, the sludge produced in metal plating factories always contains triad chromium in great quantities, and the triad chromium has a tendency to oxidize again to form hexad chromium by heating in the incineration process of the sludge. Since no proper method and apparatus have been proposed for disposing the chromium-contained sludge produced from the drainage up to the moment, the factories is frequently driven into a corner causing public nuisance troubles with the ashes containing hexad chromium in the incineration process of the sludge.

Accordingly, it is an essential object of the present invention to provide a method for incinerating and disposing of sludge, whereby the sludge can be disposed of safety in public nuisance without producing harmful materials, namely, the hexad chromium.

Also, it is another object of the present invention to provide an apparatus for incinerating and disposing of sludge, which can be substantially eliminated the disadvantages and inconveniences inherent in such a conventional disposing apparatus, and which is simple in arrangement and construction such that the installation thereof does not require a relatively large space.

According to the present invention, there is provided a method for incineration of a sludge containing chromium substance comprising a sequential combination of a step of incinerating the sludge containing chromium substance into ashes, a step of reducing hexas chromium existing within the resultant of the first step into triad chromium by means of reducing gas, and a step of cooling the resultant of the second step before discharging the same to the outside. Also, there is provided an apparatus for incineration of a sludge containing chromium substance comprising in combination of a zone for incineration of the sludge containing chromium substance into ashes, a zone for reduction of the resultant of the incineration zone by means of reducing gas, and a zone for cooling the resultant of the reduction zone. Furthermore, according to one embodiment of the present invention, in the foregoing method and apparatus, the reducing gas is produced by means of burners igniting hydrocarbon fuel at 1.0 or more of combustion air efficiency.

The method of the present invention is executed with the apparatus of the present invention on an application of reducing gas atmosphere of high temperature into which the incinerated sludge containing hexad chromium is disposed, resulting in that the hexad chromium is reduced into triad chromium which can be stabilized by cooling without being oxidized into hexad chromium again. The reducing gas atmosphere is produced not only by means of a reducing-gas generator of conventional type but also by means of a burner igniting hydrocarbon fuel, which is novel and effective in practical and economical to apply to the factories. After conducting many researches, the inventor has at last found out that, in order to reduce the hexad chromium into triad chromium, it is effective to employ the reduced combustion waste gas having a formula of $(C, H) + n(0.81\ O_2 + 0.19\ N_2) = a(CO_2) + b(CO) + c(H_2O) + d(H_2) + e(C, H) + f(N_2)$, which is produced through the combustion of hydrocarbon fuel carried out at the rate of 0.35 to 1.0 of combustion air efficiency by the operation controlling of burners in a furnace. For instance, in case that the sludge is continuously incinerated, while being carried in order from the inlet to the outlet, as in a multistage incineration furnace, the resultant from the process such as steps of the incineration for the sludge, high temperature reduction for the ashes and cooling therefor is affected substantially by changing the operating conditions of burners in every processing zone in order to reduce the hexad chromium into triad chromium. Also, in the incineration furnace of rotary kiln type, the resultant from the process such as steps of the incineration for the sludge, high temperature reduction for the ashes and cooling therefor is affected substantially by changing the operating conditions of burners for every certain fixed period from the beginning of the incineration to the end of reduction for reducing hexad chromium into triad chromium.

Figure 2:
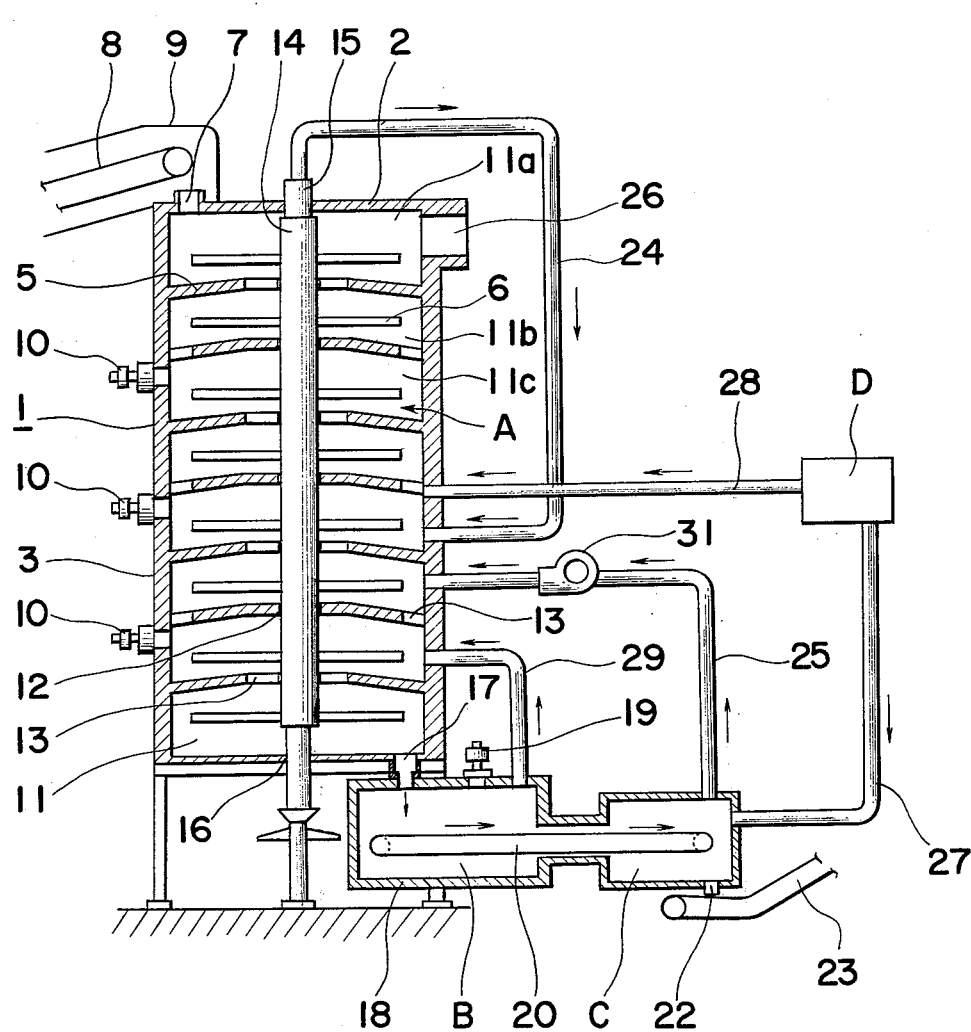
Figure 3:
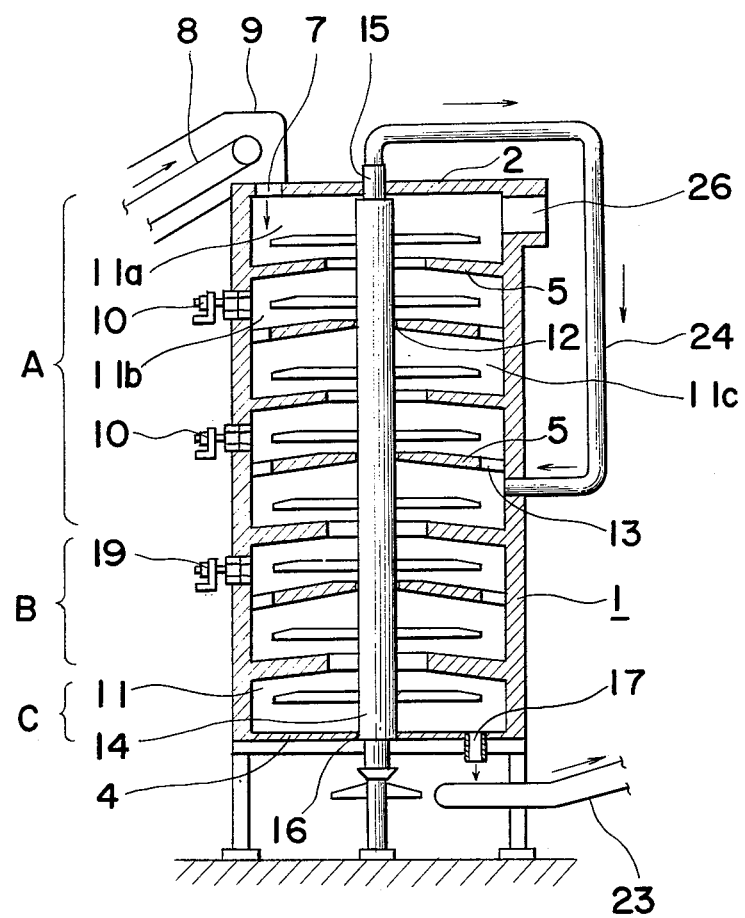
Figure 4:
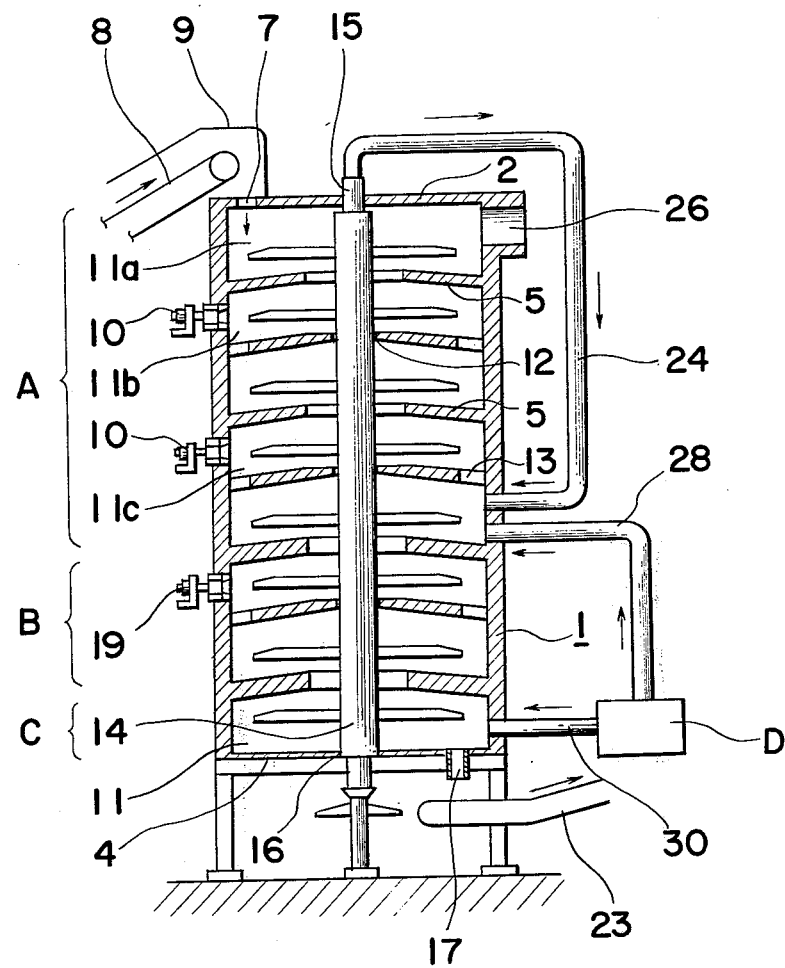

These and other objects and features of the present invention will become apparent from the following description taken in conjunction with the preferred embodiment with references to the accompanying drawings, in which:

FIG. 1 is a cross-sectional view of a sludge incineration apparatus in accordance with the first embodiment of the present invention, and FIGS. 2 to 4 are respectively cross-sectional views similar to FIG. 1 showing another embodiment of the present invention.

Referring now to FIG. 1, there is provided a zone A for incineration of the sludge comprising a cylindrical receptacle 1 which is formed of making air-tight with a top cover plate 2, a vertical, cylindrical wall 3 and a bottom base plate 4 and is provided horizontally with a plurality of partition plates 5 and of stirring arms 6 therein. On the cover plate 2 there is provided an inlet 7 for throwing the sludge into said zone A, the sludge being transported continuously by means of a conveyor 8 associated with a hood 9 from a dehydrating apparatus not shown, in which the sludge is dehydrated to the extent, for example, of 50 to 80 % in water content, to the position over the inlet 7 and, then, being dropped out of the conveyor 8 into the inlet 7 by the gravity thereof without blowing off the gas generated in said zone A to the outside. A train of burners 10 are provided along the longitudinal direction of the cylindrical wall 3 to heat the interior of said zone to the temperature of approximately 800°C under the condition igniting with 1.0 or more, for example, 1.5 of combution air efficiency, thereby to cause to incinerate the sludge introduced into the zone A into ashes.

The receptacle 1 of said zone A is divided by means of the partition plates 5 into several chambers 11$a$, 11$b$, 11$c$ . . . arranged in order of a line from the top to the bottom and each connected with both the chambers 11 above-and under-positioned through center holes 12 and openings 13 of the counterpart partition plates. Each partition plate 5 has the opening 13 through which the sludge is dropped out of the upper chamber 11$a$ into the lower chamber 11$b$ while the combution gas of burners 10 is blown up from the lower chamber 11$b$ into the upper chamber 11$a$, and which is arranged not to face to the openings 13 of the neighboring partition plate 5 in a staggered formation, thereby to render to stay both the sludge and gas in one chamber 11 as long as possible in accordance with the distance between a pair of the neighboring openings 13. The stirring arms 6 are rotatably placed at the center portions of the every chambers 11 for mixing and stirring the sludge and fixedly mounted on a shaft 14 which is extended freely through all of the holes 12 of the partition plates 5, and both ends of which are respectively received within the bearings 15, 16 provided at the center portions of the cover and base plates 2, 4. The shaft 14 is driven with the stirring arms 6 at a certain speed by a moter provided outside the receptacle 1 in a conventional known manner and not shown in the drawings. The sludge in the receptacle 1 of the incineration zone A may fall downwardly through the openings 13 of the partition plates 5 from the top to the bottom, while being stirred by the stirring arms 6 rotating with the shaft 14, and is completely incinerated by heating gas of the burners 10 into ashes.

On the base plate 4 there is provided an outlet 17 for throwing out the ashes of sludge produced in the receptacle 1 into the next zone B for reduction of the ashes which comprises a casing 18 formed of making airtight, burner 19 provided within the casing 18 to generate the reducing atmospheric gas under the condition igniting at 0.35 to 1.0 of combution air efficiency, and means of conveyor 20 for transportion the ashes from the reduction zone B into the following cooling zone C. In the reduction zone B the ashes of sludge is heated at the temperature of approximately 800°C for 2 to 30 minutes within the reducing atmospheric gas of the burners 19 which contains $CO$, $H_2$ and $N_2$ as main components effective to reduce the hexad chromium residing in the ashes into a triad chromium. Thus, the ash-content is changed from a hexad chromium into a triad chromium of a non-water-soluble compound so as to make the sludge harmless.

Then, the reduced ash-content is transported by the conveyor 20 from the reduction zone B into the cooling zone C, in which the reduced ash-content makes cool to lower the temperature to approximately 200°C by means of a radiator of conventional type not shown in the drawings. In the cooling zone C the triad chromium of the reduced ash-content is stabilized as it is by the cooling of itself without permitting to change the triad chromium into the hexad chromium any more. It is to be noted that, if the triad chromium of the reduced ash-content remains for the long time at the original temperature of 800°C, the triad chromium makes it possible to turn into the hexad chromium again, which is harmful for the human body. The cooling zone C comprises a casing 21 formed of making air-tight and connected with the casing 20 of the reduction zone B, and an outlet 22 provided at the lower portion of the casing 21, through which the triad-chromium-containing ashes are discharged from the cooling zone C to a means of conveyor 23 provided outside the cooling zone C for transporting the ashes to a conventional garbage barrel not shown in the drawings.

In addition a piping line 24 is provided to connect between the top chamber 11$a$ and middle chamber of the receptacle 1 for recirculating the waste gas of the top chamber 11$a$ into the middle chamber, and, also, another pipe line 25 is provided with a pump 31 to connect between the cooling zone casing 21 and the middle chamber of the receptacle 1 for circulating the waste gas of the casing 21 into the middle chamber, whereby the waste gases existed in the receptacle 1 and casing 21 are always utilized without loss of the heat efficiency. Also, an exhaust port 26 is provided on the cylindrical wall 3 at the top chamber of the receptacle 1 to discharge from the top chamber 11 to the outside of the receptacle 1 a certain amount of the waste gas of approximately 400°C which is the rest after the recirculation of the pipe line 24.

With the apparatus of the above construction so far described, the sludge, for example, hide drainage hydrated sludge containing chromium substance is supplied continuously by the conveyor 8 into the incineration zone A comprising, for example, an incineration furnace of a rotary kiln type with direct-fire burners, which ignites gas composing propane of 31.0 % in volume, isobutane of 20.1 %, normal butane of 48.8 % and methane-ethane of 0.1 % in the furnace, is incinerated completely by the direct fire of burners while moving down through the chambers 11 by mixing of the stirring arms 6, and is thrown out into the reduction zone B comprising, for example, a rotary retort furnace in which a small sized incinerator or burners 19 are installed to burn liquid petroleum gas at 1.0 or less of combustion air efficiency to produce a reducing gas. As one experiment, the same gas as that employed in the burners of the incineration zone is employed in the incinerator of the reduction zone B to produce the reducing gas in the condition burning at 0.35 to 1.0 of combustion air efficiency. The following data show the composition and combution air efficiency of the reducing gas produced in the reduction zone B by the burners 19.

Table I

| example | combustion air efficiency (%) | gas composition (%) | | | | | |
|---|---|---|---|---|---|---|---|
| | | $CO_2$ | $CO$ | $H_2$ | $H_2O$ | $CH_4$ | $N_2$ |
| A | 0.52 | 5.1 | 13.5 | 12.5 | 8.0 | 3.4 | the rest |

Table I-continued

| example | combustion air efficiency (%) | gas composition (%) | | | | | |
|---|---|---|---|---|---|---|---|
| B | 0.74 | 8.0 | 7.0 | 6.0 | 11.0 | 0.6 | the rest |

The ashes reduced within the reducing gas are discharged from the outlet 22 of the reduction zone casing to the outside without hexad chromium. According to a method of examination for harmful material refuses published on Feb. 17, 1973 by the Life Environment Agency of Japan, the chromium effluence test for the ashes obtained from the cooling zone C is conducted with the result that no hexad chromium is found out in the ashes, though the ashes before reduction process being contained hexad chromium of 4120 ppm. As apparent from the experimental example given above, the hexad chromium is removed completely from the ashes to be discharged to the garbage barrel. Also, it is to be noted that the incineration of the sludge in the incineration zone A and the reduction of the ashes in the reduction zone B are simply established by the employment of the burners 10, 19, of which operating conditions are different between in said two zones A, B, thereby to render to lower not only the equipment cost of the present invention but also the operation cost thereof in the application of the present invention to a newly-installed furnace or an old existing furnace.

Referring now to FIG. 2, there is shown another embodiment of the present invention in which a reducing gas producing device or generator D is employed in addition to the burners in the reducing zone B of the first embodiment. The reducing gas generator D is constituted in a known manner so as to generate continuously reducing gas with main components of CO, $H_2$ and $N_2$, and is connected by means of a pipe line 27 to the end portion of the cooling zone casing 21 near the outlet 22 thereof to supply the reducing gas into the reducing zone B through the cooling zone C which functions to preheat the reducing gas due to heat exchange with the ashes transported on the conveyor 20. As the reducing gas generator D, for instance, there can be used an apparatus wherein a mixture of hydrocarbon fuel and air is heated by the heater of outside together with a nickel catalyst provided inside a retort to produce reducing gas with CO and $H_2$.

As described hereinbefore in the first embodiment, the ashes containing hexad chromium discharged from the incineration zone A is sufficiently reduced by the reducing gas in the reduction zone B heated by burners 19 at the temperature of approximately 800°C so as to turn the hexad chromium of the ashes into a triad chromium, and, then, is cooled by the radiator and the reducing gas of low temperature to the temperature of 200°C in the cooling zone C in order to prevent the triad chromium of the ashes from turning into the hexad chromium again, the ashes containing triad chromium in the cooling zone C being discharged into the garbage barrel. In this embodiment, the waste gas from the reducing gas generator D is partially supplied to the middle chamber of the incineration zone by means of a pipe line 28 connected therebetween in the same manner as the waste gas from the cooling zone C is partially supplied by the pipe line 25 into the middle chamber of the incineration zone A. Also, the waste gas from the reduction zone casing 18 is partially supplied to the lower chamber of the incineration zone by means of a pipe line 29. This embodiment has an advantage such that the reducing gas generator D can produce at any time the reducing gas with a suitable amount and proper components by adjustment of the operation thereof in a known manner.

The further another embodiment of the present invention will be described hereinafter with reference to FIG. 3, in which the reduction zone B and the cooling zone C are rearranged into the incineration zone casing 1 of the first embodiment to form one unite in such a manner that the upper chambers 11 of the receptacle 1 constitutes the incineration zone A by the provision of burners 10 igniting with 1.0 or more of combution air efficiency, the middle chambers 11 forms the reducing zone B by the provision of burners 19 igniting with 0.35 to 1.0 of combustion air efficiency, and the lower chambers 11 makes up the cooling zone C by provision of a radiator not shown in the drawing, whereby the sludge thrown into the inlet 7 of the top cover plate 2 is sequencially moved downwards by mixing of the stirring arms 6 through the openings 13 of the partition plates 5 firstly to incineration zone A for incineration, secondary to reduction zone B for reduction and finally to cooling zone C for cooling, and the ashes of the sludge containing no hexad chromium is discharged from the outlet 17 of the bottom base plate 4 onto the conveyor 23 provided outside.

In this embodiment, the incineration zone A, reduction zone B and cooling zone C are vertically arranged in order from the top to the bottom to put into in one receptacle 1 respectively, thereby to cause to delete both the reducing zone casing and the cooling zone casing of the first embodiment associated with the pipe lines connected between the reduction zone and cooling zone and the middle chamber. With this arrangement so far described, the construction of the apparatus is simplified so as to reduce the expense for manufacturing thereof even if the height of the receptacle 1 is large more than that of the receptacle employed in the first embodiment. Also, the arrangement of this embodiment is easy to apply to a furnace of rotary Kiln type in a conventional known manner.

Furthermore, as the reducing process is effected by changing the operating condition of the burners in comparison with that of the burners in the incineration process as mentioned hereinbefore, the incineration zone can be utilized partly for incineration process at one time and partly for reducing process at the other time by changing the operating conditions of the burners in the incineration zone in such a manner that the burners are provided with valves not shown in the drawing, for shifting alternatively the burners to two operating conditions, i.e., igniting with 1.0 or more of combution-air efficiency, thereby to render to delete the reduction zone B in the receptacle 1 of this embodiment. In a case where the incineration process and the reducing process are effected in one furnace, the two process can be divided in terms of period, but not zone. With the arrangement of this embodiment, in repairing the interior of the furnace, the hexad chromium of sludge remaining in the furnace can be completely eliminated in advance by operating the burners at 1.0 or less of combution air efficiency, so that no danger to the human body or workers exists any more.

Referring now to FIG. 4, there is provided the reducing gas generator D in addition to the burners 19 in the reduction zone. The reducing gas generator D is connected to the middle chamber of the reduction zone B by means of the pipe line 28 and is connected with the lower chamber of the cooling zone by means of a pipe line 30, so that the reducing gas produced of the apparatus is supplied partly to the reduction zone B and partly to the cooling zone C. The reducing gas generator D is the same one as employed in the second embodiment.

Although the present invention has been fully described by way of examples, it is to be noted that various changes and modifications are apparent to those skilled in the art and, therefore, unless they depart therefrom, they should be construed as included within the scope of the present invention.

What is claimed is:

1. A method for incineration of a sludge containing chromium substance comprising a sequential combination of a step of incinerating the sludge containing chromium substance into ashes, a step of reducing hexad chromium existing within the resultant of the first step into triad chromium by means of reducing gas, and a step of cooling the resultant of the second step before discharging the same to the outside.

2. A method for incineration of a sludge containing chromium substance comprising a sequential combination of a step of incinerating the sludge containing chromium substance into ashes by means of burners igniting hydrocarbon fuel at 1.0 or more of combustion air efficiency, a step of reducing hexad chromium existing within the resultant of the first step into triad chromium by means of reducing gas obtained by means of burners igniting hydrocarbon fuel at 0.35 to 1.0 of combustion air efficiency, and a step of cooling the resultant of the second step before discharging the same to the outside.

3. A method for incineration of a sludge containing chromium substance comprising a sequential combination of a step of incinerating the sludge containing chromium substance by means of burners igniting hydrocarbon fuel at 1.0 or more of combustion air efficiency, a step of generating reducing gas with main components of CO and $H_2$, a step of reducing hexad chromium existing within the resultant of the first step into triad chromium by means of the reducing gas obtained in the second step, and a step of cooling the resultant of the third step before discharging the same to the outside.

4. A method for incineration of a sludge containing chromium substance as defined in claim 2, wherein the reducing gas is supplied into a zone adapted to the third step of reducing through a zone adapted to the fourth step of cooling.

5. An apparatus for incineration of a sludge containing chromium substance comprising in combination of a zone for incineration of the sludge containing chromium substance into ashes, the sludge being supplied from the outside into the incineration zone, a zone for reduction of the resultant of the incineration zone by means of reducing gas, the reduction zone being connected with the incineration zone to receive the resultant from the incineration zone, and a zone for cooling the resultant of the reduction zone, the cooling zone being connected with the reduction zone to receive the resultant from the reduction zone and with the outside to discharge the resultant of the cooling zone.

6. An apparatus for incineration of a sludge containing chromium substance comprising in combination of a zone for incineration of the sludge containing chromium substance into ashes by means of burners igniting hydrocarbon fuel at 1.0 or more of combustion air efficiency, the sludge being supplied continuously from the outside into the incineration zone, a zone for reduction of the resultant of the incineration zone by means of burners igniting hydrocarbon fuel at 0.35 to 1.0 of combustion air efficiency, the reduction zone being connected with the incineration zone to receive continuously the resultant from the incineration zone, and a zone for cooling the resultant of the reduction zone by means of a radiator to stabilize the resultant, the cooling zone being connected with the reduction zone to receive the resultant from the reduction zone and with the outside to discharge the resultant of the cooling zone.

7. An apparatus for incineration of the sludge containing chromium substance as defined in claim 6, wherein said incineration zone comprises a cylindrical receptacle provided with an inlet for the sludge at one side, an outlet for the ashes at the other side and the burners for incineration of the sludge at the center portion thereof.

8. An apparatus for incineration of the sludge containing chromium substance as defined in claim 6, wherein said incineration zone, reduction zone and cooling zone are arranged in order into one receptacle, so that the sludge is continuously moved from one end portion of the receptacle adapted for the incineration zone to the other end portion of the receptacle adapted for the cooling zone through the middle portion of the receptacle adapted for the reduction zone.

9. An apparatus for incineration of the sludge containing chromium substance as defined in claim 6, wherein said incineration zone and reduction zone are constituted within one receptacle provided with burners therein which are ignited with hydrocarbon fuel in a manner to form said incineration zone in said receptacle at one time through igniting at 1.0 or more of combustion air efficiency and to form said reduction zone in the same receptacle at the next time through igniting at 0.35 to 1.0 of combustion air efficiency.

10. An apparatus for incineration of the sludge containing chromium substance comprising in combination of a zone for incineration of the sludge containing chromium substance into ashes by means of burners igniting hydrocarbon fuel at 1.0 or more of combustion air efficiency, the sludge being supplied continuously from the outside onto the incineration zone, a device for generating reducing gas with main components of CO and $H_2$, a zone for reduction of the resultant of the incineration zone by the reducing gas supplied from the reducing gas producing device, the reduction zone being connected with the incineration zone to receive continuously the resultant from the incineration zone, and a zone for cooling the resultant of the reduction zone by means of a radiator to stabilize the resultant, the cooling zone being connected with the reduction zone to receive the resultant from the reduction zone and with the outside to discharge the resultant of the cooling zone.

* * * * *